Jan. 23, 1934. C. W. MacMILLAN Re. 19,061

INK BOTTLE PEN FILLING PROTECTOR

Original Filed Feb. 4, 1930

Inventor:
Charles Wright MacMillan

Reissued Jan. 23, 1934

Re. 19,061

UNITED STATES PATENT OFFICE 19,061

INK BOTTLE PEN FILLING PROTECTOR

Charles Wight MacMillan, Boston, Mass.

Original No. 1,811,361, dated June 23, 1931, Serial No. 425,876, February 4, 1930. Application for reissue June 20, 1933. Serial No. 676,752

9 Claims. (Cl. 120—57)

This invention relates to ink bottle pen filling protector which can be applied to the opening of any standard ink bottle to facilitate the filling of a fountain pen. This invention allows only the pen-point to come into contact with the ink, and prevents the barrel of the pen from becoming wet with ink even tho the pen be submerged to the bottom of the bottle.

Figure 1:
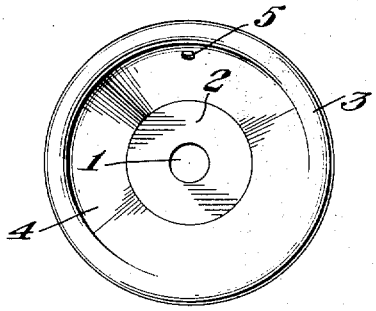
Figure 2:
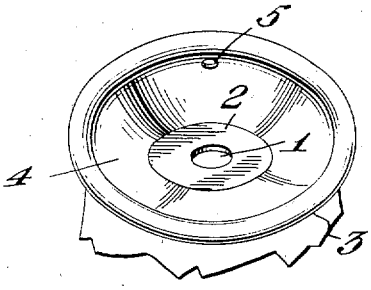
Figure 3:
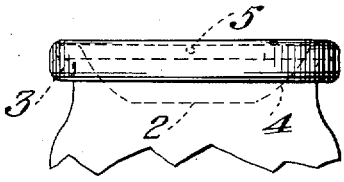
Figure 4:
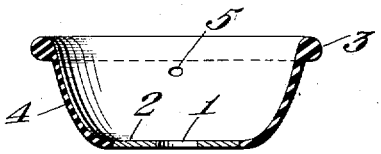
Figure 5:
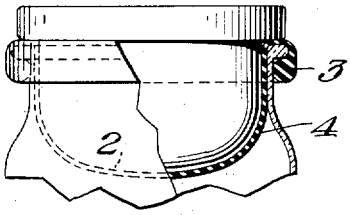
Figure 7:
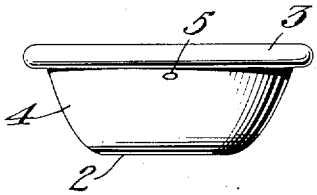
Figure 6:
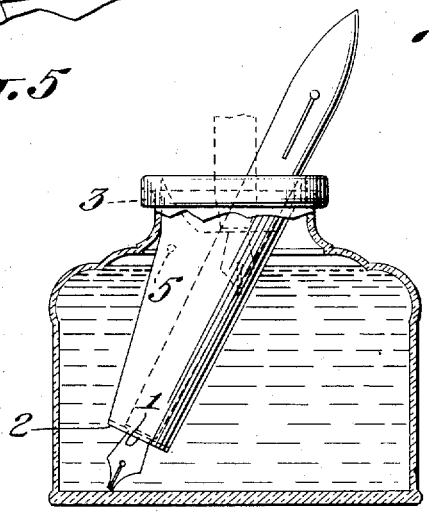

I declare the following to be an exact description of the invention. This invention is made of rubber of a grade which allows a maximum of elasticity. Figure 1 is a top and side view showing the general shape and form of the invention. Figure 2 shows the invention applied to the opening of an ink bottle by being stretched over the top. Figure 3 is a side view of the bottle top together with the invention in place. Figure 4 is an enlarged sketch showing a vertical cross section of the invention cut thru the center. Figure 5 is a side view of a bottle top with a stopper inserted and the invention in place. Figure 6 is a general view of a bottle containing ink, and illustrates the manner in which the invention is used. Figure 7 is a side view of the invention showing the general form it assumes when not applied to the opening of the bottle.

The object of this invention is to provide a simple and practical means of keeping the barrel of a pen free from ink while the pen is being filled, and thereby eliminating the soiling of the fingers, and the usual necessity of wiping the pen after filling. Furthermore, the object of this invention is also to provide a liquid-proof cushion between the stopper and the inner neck of the bottle, thus permitting the use of stoppers made of unground glass or any other practical material.

In the drawing, 1 denotes the opening in the center of the protector, and thru which the pen-point only is passed. 2 denotes a washer-shaped surface which is non-elastic to the extent of providing a firm base against which the base of the pen barrel may rest. This washer shaped ring is made of any suitable material to which the remaining rubber portion will conveniently adhere. The surface of this ring is soft, and provides a cushion against which the base of the pen barrel is pressed, thereby making a liquid-tight connection between the ring and the base of the pen barrel. 3 denotes a rubber or elastic bead which is circular in shape as well as cross-section, and which is an integral part of the complete invention. This bead is stretched over the top of the bottle and holds the invention in place. 4 denotes the thin rubber surface or wall connecting the bead and the center ring. This thin rubber part provides the main stretching surface, and enables the pen to be pushed to the bottom of the bottle. 5 denotes a small air hole of which there may be one or a plurality. This air passage is so located that it always remains above the surface of the ink, and provides an air passage into the bottle while the pen is being filled. This air passage prevents the tendency for the ink to be drawn out of the pen as the pen is removed from the bottle.

From the foregoing it will be seen that my invention applied to an ink bottle of the general size and shape shown in Figure 6 will permit of inserting a fountain pen to the bottom of the bottle without bringing the pen barrel into contact with the ink. It will also be seen that the pen may be moved to any desired position on the interior of the bottle thus enabling the pen to be filled by tilting the bottle when the ink is low. Furthermore, it will be seen that this invention provides a liquid-tight insulation between the cork and the inner surface of the bottle neck thereby making it practical to equip bottles with this invention along with an inexpensive glass or composition stopper.

What I claim is:—

1. An ink bottle pen filling protector consisting of a flat, washer-shaped ring; the flat surface of said ring being soft and forming a cushion; a thin, elastic membrane attached to and extending radially from the outer, circumferential edge of said ring; said elastic membrane terminating in a circular, elastic bead and being provided with means of allowing air to pass thru said membrane; said membrane being flexible, and elastic and assuming no definite rigid shape.

2. An ink bottle pen filling protector consisting of a substantial ring; said ring having a cushioned surface; a liquid-proof, elastic membrane being perforated to allow the passage of air; said membrane being attached to and extending radially from the outer circumference of said ring; said membrane terminating outwardly in a circular elastic bead; the complete protector being one structural unit as set forth.

3. An ink bottle pen filling protector consisting of a substantial, cushion surfaced ring; an elastic membrane attached to and extending outwardly from the outer circumference of said ring; said membrane terminating outwardly in a circular, elastic bead; said protector comprising a single unit which in use is held in place at the bottle opening by the elasticity of its bead, and which becomes elongated by means of pressure applied at its cushioned ring.

4. An article for filling fountain pens comprising an ink container, means to form ink-excluding engagement with the mouth of a fountain pen barrel, and ink-excluding means movably connecting said mouth-engaging means with said container, whereby the point of a pen may be brought into contact with ink in the container at any level whatsoever without any ink being permitted to touch the sides of the pen barrel.

5. An article for filling fountain pens comprising an ink-container and a pen-filling protector attached to said container, the protector comprising means to engage the container, means to form ink-excluding engagement with the mouth of a fountain pen barrel, and ink-excluding means movably joining said mouth-engaging means to said container engaging means, whereby a fountain-pen thrust into the container to any depth whatsoever is touched by the ink in the container only at the point of said pen.

6. An ink container pen filling protector comprising means to form ink-excluding engagement with the mouth of a fountain pen, means to engage an ink-container, and ink-excluding means movably connecting the mouth-engaging means to the container-engaging means.

7. An ink container pen filling protector comprising means to form ink-excluding engagement with the mouth of a fountain pen, means to engage an ink-container, and elastic ink-excluding means movably connecting the mouth-engaging means to the container-engaging means.

8. An ink container pen filling protector consisting of a cushioned apertured member shaped to form ink-excluding engagement with the mouth of a fountain pen, means to engage an ink container, and elastic ink-excluding means movably joining the mouth-engaging member to the container engaging means.

9. An ink container pen filling protector consisting of a cushioned apertured portion shaped to form ink-excluding engagement with the mouth of a fountain pen, a resilient portion to engage firmly said container, and an elastic ink-excluding portion resiliently connecting said apertured portion to said container engaging portion.

CHARLES WIGHT MACMILLAN.